(12) United States Patent
Song et al.

(10) Patent No.: US 9,437,209 B2
(45) Date of Patent: Sep. 6, 2016

(54) SPEECH ENHANCEMENT METHOD AND DEVICE FOR MOBILE PHONES

(71) Applicant: Goertek, Inc., Weifang, ShanDong Province (CN)

(72) Inventors: Liu Song, Weifang (CN); Bo Li, Weifang (CN); Shasha Lou, Weifang (CN)

(73) Assignee: Goertek, Inc., Weifang, Shandong Province (CN)

(*) Notice: Subject to any disclaimer, the term of this patent is extended or adjusted under 35 U.S.C. 154(b) by 0 days.

(21) Appl. No.: 14/401,198

(22) PCT Filed: Aug. 1, 2013

(86) PCT No.: PCT/CN2013/080634
§ 371 (c)(1),
(2) Date: Nov. 14, 2014

(87) PCT Pub. No.: WO2014/023183
PCT Pub. Date: Feb. 13, 2014

(65) Prior Publication Data
US 2015/0142426 A1     May 21, 2015

(30) Foreign Application Priority Data
Aug. 7, 2012    (CN) .......................... 2012 1 0278704

(51) Int. Cl.
*G10L 21/00* (2013.01)
*G10L 21/0208* (2013.01)
(Continued)

(52) U.S. Cl.
CPC .......... *G10L 21/0208* (2013.01); *G10L 25/78* (2013.01); *H04M 1/6008* (2013.01); *G10L 21/02* (2013.01); *G10L 2021/02161* (2013.01); *H04M 2250/12* (2013.01)

(58) Field of Classification Search
CPC .............. H04R 3/005; G10L 21/0205; G10L 2021/02165; G10L 21/02
USPC ....................................................... 704/226
See application file for complete search history.

(56) References Cited

U.S. PATENT DOCUMENTS 8,611,552 B1 * 12/2013 Murgia ................ H04R 1/1083
381/71.1
2012/0027218 A1 * 2/2012 Every ................. G10L 21/0208
381/66

(Continued)

FOREIGN PATENT DOCUMENTS

| CN | 1794757 | 6/2006 |
| CN | 1898725 | 1/2007 |

(Continued)

*Primary Examiner* — Daniel Abebe
(74) *Attorney, Agent, or Firm* — Boyle Fredrickson, S.C.

(57) ABSTRACT

The present invention discloses a speech enhancement method and device for mobile phones. By the method and device provided by the present invention, the mobile phone holding state of a user is detected when the user is talking on the phone, so that different denoising solutions will be employed according to the state of the user in holding the mobile phone. When the user holds the mobile phone normally, a solution integrating multi-microphone denoising and single-microphone denoising will be employed to effectively suppress both the steady noise and the non-steady noise; and when the user holds the mobile phone abnormally, a solution of single-microphone denoising will be employed only to suppress the steady noise. The distortion of speech by multi-microphone denoising is avoided, and the speech quality is ensured.

10 Claims, 2 Drawing Sheets

(51) Int. Cl.
*H04M 1/60* (2006.01)
*G10L 25/78* (2013.01)
*G10L 21/02* (2013.01)
*G10L 21/0216* (2013.01)

(56) References Cited

U.S. PATENT DOCUMENTS

2012/0123772 A1* 5/2012 Thyssen .............. G10L 21/0208
704/226
2012/0128175 A1* 5/2012 Visser .................... H04R 3/005
381/92
2012/0281853 A1* 11/2012 Dunn .................... H04R 3/005
381/92
2013/0096914 A1* 4/2013 Avendano ........... G10L 21/0208
704/226
2013/0121498 A1* 5/2013 Giesbrecht ............ H04M 9/082
381/66
2013/0196715 A1* 8/2013 Hansson ................. H04M 1/19
455/563

FOREIGN PATENT DOCUMENTS

| CN | 102300140 | 12/2011 |
| CN | 102611965 | 7/2012 |
| CN | 102801861 | 11/2012 |
| CN | 202957890 | 5/2013 |

* cited by examiner

SPEECH ENHANCEMENT METHOD AND DEVICE FOR MOBILE PHONES

TECHNICAL FIELD

The present invention relates to the technical field of speech signal processing, in particular to a speech enhancement method and device for mobile phones.

BACKGROUND OF THE PRESENT INVENTION

Mobile phones, which have been widely applied both in people's daily life and work, relieve spatial and temporal constrains to communication and provide great convenience for people's life and work. However, the communication environment is complex and ever changing, among which chaotic environment noise is included. Environment noise will seriously degrade the speech quality of calls on the mobile phones. Therefore, the speech enhancement techniques have significant implications for noise suppression on the mobile phones.

At present, the usually used speech enhancement techniques include single-microphone spectral subtraction speech enhancement technique which is also referred to as single-channel spectral subtraction speech enhancement technique or may be referred to as single-microphone denoising technique. Such technique may suppress steady noise only, without significant suppression effect for non-steady noise, for example, voices of the people around you in malls, supermarkets or restaurants.

Another preferred denoising technique is multi-microphone array speech enhancement technique which is also referred to as multi-microphone denoising technique. Such technique further includes the following two types.

A first type is where a fixed directionality is formed by means of multi-microphone signal processing. That is, sound from one specified direction is retained and sound from other directions is suppressed. When the directionality formed by such processing points to the mouth of the user, the purpose of protecting the speech and suppressing the noise around is realized.

Figure 1:
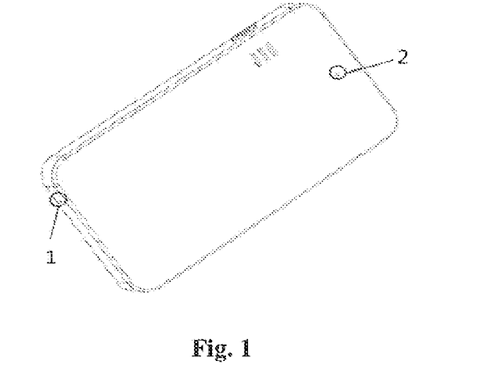
FIG. 1 is a schematic diagram of installation positions of microphones of a double-microphone mobile phone.

A second type is where the speech is distinguished from noise by the energy difference of signals received by a plurality of microphones for the purpose of denoising. FIG. 1 is a diagram showing locations in which a plurality of microphones are mounted, in the solution of distinguishing the speech from noise by the energy difference of signals received by the plurality of microphones for the purpose of denoising. As shown in FIG. 1, there are two microphones, i.e., a main microphone 1 and an auxiliary microphone 2. The main microphone 1 is mounted on the bottom of a mobile phone close to the human mouth, and the energy of the speech signals received by the main microphone 1 from the user is quite high. The auxiliary microphone 2 is mounted on the top of the mobile phone far away from the human mouth, and the energy of the speech signals received by the auxiliary microphone 2 from the user is low. As shown in FIG. 1, the energy of the external environment noise received by the two microphones is very close to each other. Therefore, by comparing the difference of energy of signals received by the two microphones, it may be judged whether a signal is a speech signal or noise signal. As a result, the speech component is retained while the noise component is suppressed, and the signal to noise ratio is thus increased.

Figure 2:
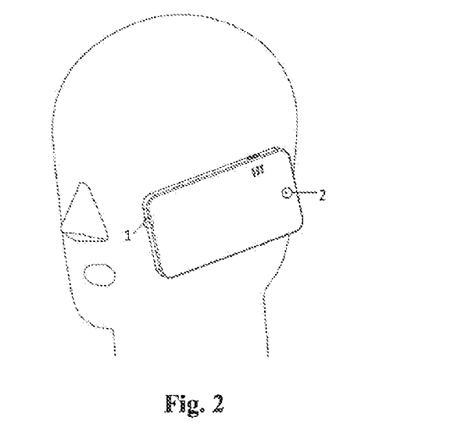
FIG. 2 is a schematic diagram showing a state when a user holds a mobile phone normally.
Figure 3:
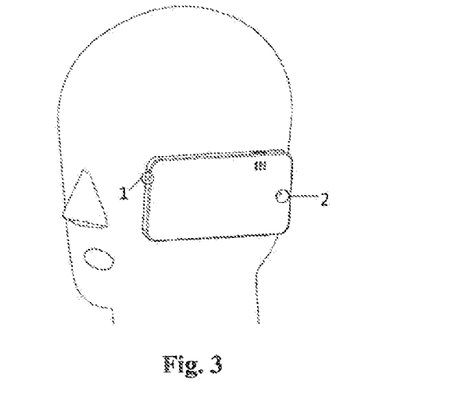
FIG. 3 is a schematic diagram showing a state when a user holds a mobile phone abnormally.

Compared with the single-microphone denoising technique, the multi-microphone denoising technique has the advantage that it may effectively suppress the non-steady noise. However, the multi-microphone denoising technique has strict constrains to the way of using a mobile phone by the user. That is, the way of holding the mobile phone by the user will be constrained. For the first type of technique utilizing the directionality, the user must keep holding the mobile phone in a way of pointing to the human mouth, otherwise the human mouth will deviate from the direction specified to be protected if the user holds the mobile phone in a different way. In this case, the speech will be suppressed as noise from other directions. The same is for the second type of technique utilizing the difference of energy, where the user is also required to hold the mobile phone with the main microphone kept close to the human mouth while the auxiliary microphone kept away from the mouth, as shown in FIG. 2 that is a diagram illustrating a state when the user holds a mobile phone normally. When the user holds the mobile phone abnormally, for example, the mobile phone is held horizontally as shown in FIG. 3 that is a diagram illustrating a state when the user holds a mobile phone abnormally, as the distance from the main microphone to the mouth is close to the distance from the auxiliary microphone to the mouth, the energy of the speech received by the two microphones is close to each other. In this case, the speech will also be suppressed as noise.

SUMMARY OF THE PRESENT INVENTION

In this regard, the present invention provides a speech enhancement method and device for mobile phones, to solve the problem that single-microphone denoising can suppress the steady noise only and multi-microphone denoising may distort the speech signal when the user holds the mobile phone abnormally although it can suppress the non-steady noise.

To achieve the above purpose, the technical solution of the present invention is implemented in the following manner.

The present invention discloses a speech enhancement method for mobile phones, a main microphone being provided on the bottom of a mobile phone, one or more auxiliary microphones being provided in the mobile phone at a position far away from the main microphone, characterized in that the method includes the following steps of:

judging whether a user is talking or listening according to signals from both the main microphone and the auxiliary microphones;

further detecting the mobile phone holding state of the user, i.e., whether the user holds the mobile phone normally or abnormally, when judging that the user is talking, and keeping the previous speech enhancement solution unchanged when judging that the user is listening;

employing a solution integrating multi-microphone denoising and single-microphone denoising to perform speech enhancement, when detecting that the user holds the mobile phone normally; and employing a solution of single-microphone denoising only to perform speech enhancement, when detecting that the user holds the mobile phone abnormally.

The present invention further discloses a speech enhancement device for mobile phones, a main microphone being provided on the bottom of a mobile phone, one or more auxiliary microphones being provided in the mobile phone at a position far away from the main microphone, characterized in that the device includes a detection unit and denoising unit, wherein:

the detection unit is configured to judge whether a user is talking or listening according to signals from both the main microphone and the auxiliary microphones; further detect the mobile phone holding state of the user, i.e., whether the user holds the mobile phone normally or abnormally, and notify the denoising unit with the result of detection, when judging that the user is talking; and, do no further operation, and allow the denoising unit to keep the previous speech enhancement solution unchanged when judging that the user is listening; and the denoising unit is configured to, when receiving a notification indicating that the user holds the mobile phone normally, employ a solution integrating multi-microphone denoising and single-microphone denoising to perform speech enhancement; and, when receiving a notification indicating that the user holds the mobile phone abnormally, employ a solution of single-microphone denoising only to perform speech enhancement.

In the device, the detection unit includes a near-field speech detection module and a holding state detection module; and the denoising unit includes a multi-microphone denoising module and a single-microphone denoising module; wherein:

the near-field speech detection module is configured to receive signals from both the main microphone and the auxiliary microphones, judge whether a user is talking or listening according to signals from both the main microphone and the auxiliary microphones, send a notification to the holding state detection module when judging that the user is talking, and not to send a notification to the holding state detection module when judging that the user is listening;

the holding state detection module is configured to receive signals from both the main microphone and the auxiliary microphones, detect the mobile phone holding state of the user, i.e., whether the user holds the mobile phone normally or abnormally, when receiving a notification from the near-field speech detection module, send the signals from both the main microphone and the auxiliary microphones to the multi-microphone denoising module when detecting that the user holds the mobile phone normally, and send the signal from the main microphone to the single-microphone denoising module when detecting that the user holds the mobile phone abnormally;

the multi-microphone denoising module is configured to perform multi-microphone denoising to the received signal and then send the denoised signal to the single-microphone denoising module; and the single-microphone denoising module is configured to perform single-microphone denoising to the received signal and the output the denoised signal.

In conclusion, by the method and device provided by the present invention, the mobile phone holding state of a user is detected when the user is talking on the phone, so that different denoising solutions will be employed according to the state of the user in holding the mobile phone. When the user holds the mobile phone normally, a solution integrating multi-microphone denoising and single-microphone denoising will be employed to effectively suppress both the steady noise and the non-steady noise; and when the user holds the mobile phone abnormally, a solution of single-microphone denoising will be employed only to suppress the steady noise. The distortion of speech by multi-microphone denoising is avoided, and the speech quality is ensured.

DETAILED DESCRIPTION OF THE PRESENT INVENTION

The present invention relates to a speech enhancement technique for mobile phones. The present invention employs a mobile phone holding state detection technique, in which a solution integrating multi-microphone denoising with single-microphone denoising is employed when a user holds a mobile phone normally, so that the optimal denoising effect may be ensured when the user holds the mobile phone correctly; and when the user holds the mobile phone abnormally, a solution of single-channel denoising is employed, so that only the steady noise is suppressed, and the distortion of speech caused by multi-microphone denoising is avoided. That is, in the present invention, the detection to the mobile phone holding state of a user is added on the basis of multi-microphone denoising, so that different denoising technologies may be employed for different mobile phone holding states, and the optimal denoising is thus ensured while avoiding the speech distortion.

The technical solutions of the present invention will be analyzed and described as below in details.

When a call is made by a mobile phone in a noisy environment, a user often has the following situation that his/her own voice is downed by the noise around and thus cannot be clearly heard by the person he/she is talking with. What is disclosed by the present invention is a multi-microphone denoising technique for eliminating the noise and remaining clear speech so that a call may still be made fluently and clearly even in a noisy environment. The plurality of microphones herein includes two or more microphones. Therefore, this technique is suitable for mobile phones with two or more microphones. FIG. 1 is a schematic diagram of installation positions of microphones of a double-microphone mobile phone, wherein a main microphone 1 is mounted on the bottom of the mobile phone, while an auxiliary microphone 2 is mounted in an upper part of the rear side of the mobile phone. In other circumstances, there may be three or more microphones, wherein only one main microphone is mounted on the bottom of the mobile phone, while the remaining multiple auxiliary microphones are mounted on the mobile phone at positions far away from the main microphone, for example, the top or the upper part of rear side of the mobile phone.

There are usually two holding ways when a user talks on a mobile phone:

1. Holding normally: the main microphone 1 on the bottom of the mobile phone is kept close to the mouth of the user, as shown in FIG. 2. In this case, by a solution integrating multi-microphone denoising with single-microphone denoising in the present invention, the noise may be better eliminated without distorting the speech quality.

2. Holding abnormally: the main microphone 1 on the bottom of the mobile phone is kept far away from the mouth of the user, as shown in FIG. 3. In this case, if the multi-microphone denoising technique is employed, the speech will be eliminated as noise while eliminating the noise. Therefore, only the single-microphone denoising is employed in the present invention.

The technical solutions of the present invention mainly include two units: a detection unit and a denoising unit. The detection unit is used for detecting the current call state. These states include: a user is talking or listening, and the user holds a mobile phone normally or abnormally, wherein a user being talking or listening is detected by a near-field speech detection module; and the mobile phone holding state of a user is further detected by a holding state detection module.

The principle of the near-field speech detection module is as follows: when a user uses a mobile phone, regardless of holding normally or abnormally, the distance from the mouth of the user to microphones on the mobile phone will be less than 20 cm, and the mouth may be regarded as a near-field sound source. The noise sources around are generally more than 50 cm away from a mobile phone, and may all be regarded as far-field sound sources. Therefore, by detecting the distance of a sound source, it may be judged whether the user is talking or the user is not talking with only noise around. If it is a near-field sound source, the correlation between signals received by two microphones is high. If it is a far-field sound source, the correlation between signals received by two microphones is low. Therefore, by calculating the correlation between signals from the main microphone and the auxiliary microphone, it may be judged whether a signal is speech of the user or noise around. The following describes the specific detection steps:

1. A correlation value between a signal from the main microphone and a signal from auxiliary microphones is calculated; a correlation value between the signal from the main microphone and the signal from each of the auxiliary microphones is calculated and the correlation values are averaged to obtain an average correlation value, or, a correlation value between the signal from the main microphone and the signal from one of the auxiliary microphones is calculated.

2. It is judged that the signal is a far-field noise signal and the user is a listening if the correlation value is less than or equal to a set threshold, and it is judged that the signal is a near-field speech signal and the user is talking if the correlation value is greater than the set threshold.

If the user is talking, the holding state of the user is further detected. In the present invention, there are following two methods for detecting the holding state of a user:

The first method: detecting the direction of the speech by a plurality of microphones, judging the holding state of the user through the direction of the speech, determining that the user holds the mobile phone normally if the speech comes from the bottom of the mobile phone, and determining that the user holds the mobile phone abnormally if the speech comes from the lateral or top of the mobile phone; and The second method: judging the holding state of a user by a difference between the energy of the signals from multiple microphones: determining that the user holds the mobile phone normally if the ratio of the energy of the signal from the main microphone to the energy of the signal from the auxiliary microphones is greater than a set threshold, and determining the user holds the mobile phone abnormally if the energy ratio is less than or equal to the set threshold.

After the judgment by the detection unit, the denoising unit employs a corresponding denoising solution according to different states:

1. A multi-microphone denoising mode is employed if the user holds normally: a majority of noise is suppressed at first by multi-microphone denoising, and then the residual steady noise is suppressed by single-microphone denoising, so that the optimal denoising is achieved.

2. A single-microphone denoising mode is employed if the user holds abnormally: instead of the multi-microphone denoising, the steady noise is suppressed only by single-microphone denoising, so that the optimal speech quality is ensured.

3. When the user is listening, the denoising mode is kept unchanged. That is, the previous speech enhancement processing mode is kept unchanged. As the user does not talk, the holding state of the user cannot be determined. The previously detected holding state will be regarded as unchanged, so the denoising mode is kept unchanged.

By the present invention, different denoising modes may be employed according to the holding state in which a user is using a mobile phone, so that the noise is effectively eliminated without distorting the speech signals.

To make the objects, technical solutions and advantages of the present invention clearer, the speech enhancement device for mobile phones provided by the present invention will be described as below in details with reference to the accompanying drawings.

By taking the mobile phone with two microphones as shown in FIG. 1 as example, where the main microphone 1 is disposed on the bottom of the mobile phone, and the auxiliary microphone 2 is disposed at an upper part of the rear side of the mobile phone and far away from the main microphone 1. When the user holds the mobile phone normally, as shown in FIG. 2, a distance from the main microphone 1 to the mouth is less than 5 cm, and a distance from the auxiliary microphone 2 to the mouth is 15 cm-20 cm. When the user holds the mobile phone abnormally, as shown in FIG. 3, the distance from the main microphone 1 to the mouth is greater than 10 cm, and the distance from the auxiliary microphone 2 to the mouth is 15 cm-20 cm. Therefore, when the user holds the mobile phone normally, the difference between the speech energy received by the main microphone 1 and the speech energy received by the auxiliary microphone 2 is greater than 9 dB; and, when the user holds the mobile phone abnormally, the difference between the speech energy received by the main microphone 1 and the speech energy received by the auxiliary microphone 2 is within 3 dB. No matter what holding manner, the difference between the noise energy received by the main microphone 1 and the noise energy received by the auxiliary microphone 2 is within 3 dB. Therefore, when the user holds the mobile phone normally, the speech may be distinguished from the noise by the difference of energy between the two microphones, and the noise may be effectively suppressed by multi-microphone denoising without distorting the speech. However, when the user holds the mobile phone abnormally, the speech may not be distinguished from the noise by the difference of energy between the two microphones, and the speech will be distorted if multi-microphone denoising is employed. In this case, in order to protect the speech, only single-microphone denoising may be employed to suppress the steady noise.

In the embodiment of the present invention, alternatively, one main microphone 1 may be disposed on the bottom of a mobile phone, and more than two auxiliary microphones may be disposed, for example, on the top or the upper part of rear side of the mobile phone, far away from the installation position of the main microphone. The plurality of auxiliary microphones may be distributed on the top or the upper part of rear side of the mobile phone, very close to each other.

In this embodiment, there are P (P is a natural number greater than 1) microphones: a time domain signal $s_1$ received by the main microphone and time domain signals $s_2, \ldots, s_P$ received by the plurality of auxiliary microphones are first converted into frequency domain signals $S_1, \ldots, S_P$ by Fast Fourier Transform (FFT). The frequency domain signals are input into the near-field speech detection module. The near-field speech detection module judges the input signals are near-field signals or far-field noise by the correlation between the signal from the main microphone and the signals from the auxiliary microphones. If the near-field speech detection module detects that the input signals are near-field speech signals, the frequency domain signals are input into a holding state detection module. The holding state detection module judges whether a user holds the mobile phone normally or abnormally by the difference between the total energy of the signal from the main microphone and the total energy of the signals from the auxiliary microphones; if it is judged that the user holds the mobile phone normally, P paths of frequency domain signals from the P microphones are input into a multi-microphone denoising module for denoising and then for single-microphone denoising, and a path of denoised frequency domain signals is output finally. If the user holds the mobile phone abnormally, only one path of frequency domain signals $S_1$ from the main microphone is input into a single-microphone denoising module for denoising, and one path of denoised frequency domain signals is output. If the near-field speech detection module detects that the input signals are far-field noise signals, the holding state cannot be determined at this time, so the current denoising mode is kept unchanged. The denoised frequency domain signals are converted into time domain signals by Inverse Fast Fourier Transform (IFFT) and then output. The detailed processing structure refers to FIG. 4.

Figure 4:
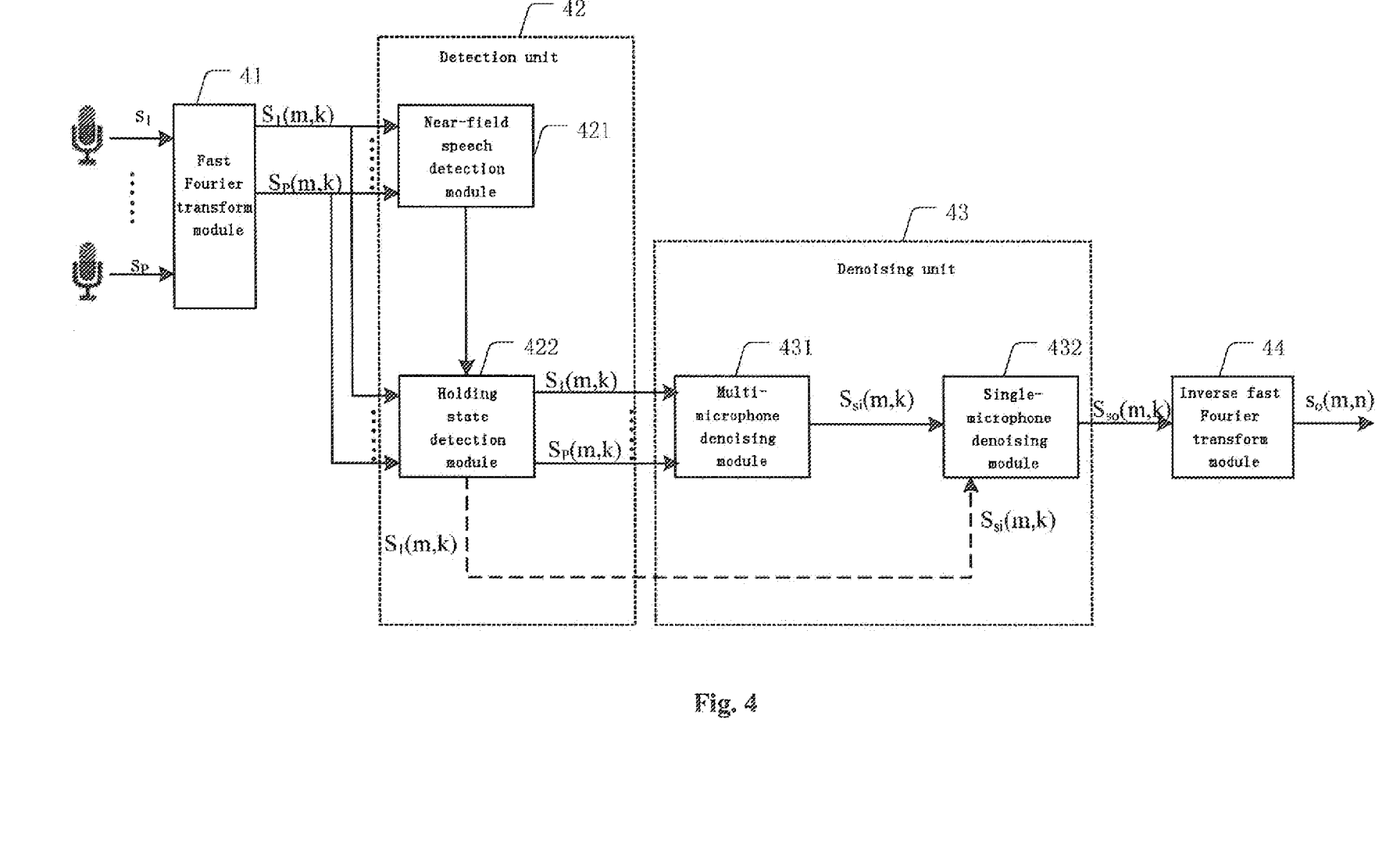
FIG. 4 is a structure diagram of a speech enhancement device for mobile phones according to an embodiment of the present invention.

FIG. 4 is a structure diagram of a speech enhancement device for mobile phones according to an embodiment of the present invention. Referring to FIG. 4, the device includes a fast Fourier transform module 41, a detection unit 42, a denoising unit 43 and an inverse fast Fourier transform module 44, wherein:

the fast Fourier transform module 41 is configured to perform fast Fourier transform to the signals from both the main microphone and the auxiliary microphones, respectively, and then sends the transformed signals to the detection unit 42;

the detection unit 42 is configured to judge whether a user is talking or listening according to signals from both the main microphone and the auxiliary microphones; further detect the mobile phone holding state of the user, i.e., whether the user holds the mobile phone normally or abnormally, and notify the denoising unit 43 with the result of detection, when judging that the user is talking; and, do no further operation, and allow the denoising unit 43 to keep the previous speech enhancement solution unchanged when judging that the user is listening;

the denoising unit 43 is configured to, when receiving a notification indicating that the user holds the mobile phone normally, employ a solution integrating multi-microphone denoising with single-microphone denoising to perform speech enhancement; and, when receiving a notification indicating that the user holds the mobile phone abnormally, employ a solution of single-microphone denoising only to perform speech enhancement; and the inverse fast Fourier transform module 44 is configured to perform inverse fast Fourier transform to the signals 43 output from the denoising unit 43 and then output the transformed signals.

As shown in FIG. 4, the detection unit 42 includes a near-field speech detection module 421 and a holding state detection module 422; and, the denoising unit 43 includes a multi-microphone denoising module 431 and a single-microphone module 432, wherein:

the near-field speech detection module 421 is configured to receive signals from both the main microphone and the auxiliary microphones, judge whether a user is talking or an listening according to signals from both the main microphone and the auxiliary microphones, send a notification to the holding state detection module 422 when judging that the user is talking, and not to send a notification to the holding state detection module 422 when judging that the user is listening, such that the holding state detection module 422 will input corresponding signals to the denoising unit 43 still according to the previous result of holding state judgment and the denoising unit 43 still keeps the previous denoising mode unchanged;

the holding state detection module 422 is configured to receive signals from both the main microphone and the auxiliary microphones, detect the mobile phone holding state of the user, i.e., whether the user holds the mobile phone normally or abnormally, when receiving a notification from the near-field speech detection module 421, send the signals from both the main microphone and the auxiliary microphones to the multi-microphone denoising module 431 when detecting that the user holds the mobile phone normally, and send the signal from the main microphone to the single-microphone denoising module 432 when detecting that the user holds the mobile phone abnormally;

the multi-microphone denoising module 431 is configured to perform multi-microphone denoising to the received signal and then send the denoised signal to the single-microphone denoising module 432; and the single-microphone denoising module 432 is configured to perform single-microphone denoising to the received signal and the output the denoised signal.

The specific processing process of each module will be described as below in details.

Fast Fourier Transform Module 41:

At first framing is performed to $S_i$ ($i=1, \ldots, P$), there are N sampling points in each frame, and the signal in the $m^{th}$ frame is $d_i$ (m,n), where $0 \leq n \leq N$, and $m \geq 0$. Aliasing of M sampling points appears in two adjacent frames, that is, first M sampling points of the current frame are the last M sampling points of the previous frame, and there is new data of only L=N−M sampling points in each frame. Therefore, the $m^{th}$ frame data is $d_i(m,n)=S_i(m*L+n)$. For example, in this embodiment, it is supposed that flame length N=256 and aliasing M=128, i.e., 50% of aliasing. Windowing is performed to the signal in each frame by a window function win(n) after framing, and the windowed data is $w_i(m,n)$=win(n)*$d_i$(m,n). The window function may be Hamming window, Hanning window or other window functions. In this embodiment, the window function is a Hanning window:

$$\text{win}(n) = 0.5\left(1 - \cos\left(\frac{2\pi n}{N-1}\right)\right).$$

The windowed data is finally converted into frequency domain by FFT:

$$S_i(m, k) = A_i(m, k)e^{-j\phi_1(m,k)} = \sum_{n=0}^{N-1} w_i(m, n)e^{-j2\pi nk/N},$$

where $$0 \le k \le \frac{N}{2}$$

is the frequency subband, $A_i(m,k)$ is the amplitude and $\phi_i(m,k)$ is the phase.

Near-Field Speech Detection Module 421:

The near-field speech detection module 421 is configured to calculate a correlation value between the signal from the main microphone and the signal from each of the auxiliary microphones, judge that the user is talking if the correlation value is greater than a first threshold, and judge that the user is listening if the correlation value is less than or equal to the first threshold.

In the case of only one auxiliary microphone, the correlation value between the signal from the main microphone and the signal from the auxiliary microphone may be calculated directly. In the case of more than two auxiliary microphones, the near-field speech detection module 421 may calculate a correlation value between the signal from the main microphone and the signal from each of the auxiliary microphones and then average the correlation values to obtain an average correlation value, or, calculate a correlation value between the signal from the main microphone and the signal from one of the auxiliary microphones.

Specifically, in this embodiment, the near-field speech detection module 421 calculates, on each frequency subband, a correlation function $Coh_{12}(m,k)$ of the signal $S_1$ from the main microphone and a signal such as $S_2$ from one auxiliary microphone:

$$Coh_{12}(m, k) = \left(\frac{abs(conj(S_1(m, k))S_2(m, k))}{abs(S_1(m, k)) * abs(S_2(m, k))}\right)^2,$$

Wherein, conj(•) is the conjugate operation, abs(•) denotes is the modulus operation. Then, an average $Mcoh_{12}(m)$ of correlation functions of all frequency bands is calculated:

$$MCoh_{12}(m) = \frac{1}{N}\sum_{k=0}^{N-1} Coh_{12}(m, k).$$

Similarly, a correlation value $Mcoh_3(m)$ between the signal $S_1$ from the main microphone and a signal such as $S_3$ from other auxiliary microphones may be calculated, and so on. Finally, the correlation values between the signal from the main microphone and the signals from the auxiliary microphones are averaged to obtain a final correlation value $MCoh(m)$.

The larger the $MCoh(m)$ is, the smaller the distances from a sound source to the two microphones are. It is determined whether the sound comes from a near-field sound source or from a far-field sound source by comparing the $MCoh(m)$ with a set threshold $Coh\_th$, so that it is further determined whether the sound is the speech of a user or ambient noise. For example, the $Coh\_th$ is set as 0.5 in this embodiment. If $MCoh(m) > Coh\_th$, it is indicated that the correlation is large enough, the signals come from a near field, the sound is the speech of a user, and the user is talking. If $MCoh(m) \le Coh\_th$, it is indicated that the correlation is relatively small, the signals come from a far field, the sound is ambient noise, and the user is listening.

Holding State Detection Module 422:

the holding state detection module 422 is configured to calculate a ratio of the energy of the signal from the main microphone to the energy of the signal from the auxiliary microphones, determine that the user holds the mobile phone normally if the ratio is greater than a second threshold, and determine the user holds the mobile phone abnormally if the ratio is less than or equal to the second threshold.

Specifically, the holding state detection module 422 calculate the total energy $P_1(m)$ of the signal St from the main microphone and the total energy $P_2(m)$ of a signal such as $S_2$ from one auxiliary microphone:

$$P_i(m) = \sum_{k=0}^{N-1}(abs(S_i(m, k)))^2;$$

then, a ratio of the two total energies is calculated $$Pr_{12}(m) = \frac{P_1(m)}{P_2(m)}.$$

In a similar way, a ratio of the total energy of the signal $S_1$ from the main microphone to the total energy of a signal such as $S_3$ from the another auxiliary microphone may be calculated $$Pr_{13}(m) = \frac{P_1(m)}{P_3(m)},$$

and so on. Finally, these total energy ratios are averaged to obtain a final ratio $Pr(m)$. In other embodiments of the present invention, the energy of the signals from the auxiliary microphones may be averaged at first, and then the ratio $Pr(m)$ is obtained by dividing the energy of the signal from the main microphone by the average.

A larger $Pr(m)$ indicates that the main microphone is closer to the human mouth. Otherwise, a smaller $Pr(m)$ indicates the main microphone is farther away from the human mouth. The mobile phone holding state is determined by comparing $Pr(m)$ with a threshold $Pr\_th$. For example, the $Pr\_th$ is set as 2 in this embodiment, if $Pr(m) > Pr\_th$, it is indicated that the user holds the mobile phone normally. If $Pr(m) \le Pr\_th$, it is indicated that the user holds the mobile phone abnormally.

In other embodiments of the present invention, the holding state detection module 422 may also detect the direction of the speech by a plurality of microphones, determine that the user holds the mobile phone normally if the speech comes from the bottom of the mobile phone, and determine that the user holds the mobile phone abnormally if the speech comes from the lateral or top of the mobile phone;

Multi-Microphone Denoising Module 431:

The multi-microphone denoising module 431 is configured to, on each of the frequency subbands, calculate a ratio of the energy of the signal from the main microphone to the energy of the signal from the auxiliary microphones on the frequency subband, and determine a value of a noise suppression function on the frequency subband according to the ratio of energy; and multiply the noise suppression function by the signal from the main microphone to obtain a signal with suppressed non-steady noise and outputs the signal with suppressed non-steady noise to the single-microphone denoising module 432.

Specifically, the multi-microphone denoising module 431 calculates a ratio of the energy of the signal $S_1$ from the main microphone to the energy of a signal such as $S_2$ from one auxiliary microphone on each of the frequency subbands:

$$Pb_{12}(m,k) = \frac{A_1(m,k)}{A_2(m,k)}.$$

In a similar way, a ratio of the total energy of the signal $S_1$ from the main microphone to the total energy of a signal such as $S_3$ from other auxiliary microphones may be calculated:

$$Pb_{13}(m,k) = \frac{A_1(m,k)}{A_3(m,k)}.$$

By such analogy, a ratio of the total energy of the signal $S_1$ from the main microphone to the total energy of the signal $S_p$ from the last auxiliary microphone may be calculated:

$$Pb_{1P}(m,k) = \frac{A_1(m,k)}{A_P(m,k)}.$$

Finally, these total energy ratios are averaged to obtain a final ratio Pb(m,k). In other embodiments, the energy of the auxiliary microphones may also be summed and averaged at first, and the energy of the signal from the main microphone is then divided by the average to, obtain the ratio Pb(m,k).

A larger Pb(m,k) indicates the probability of the signal component of the $k^{th}$ frequency subband being speech is larger Otherwise, a smaller Pb(m,k) indicates the probability of the signal component of the $k^{th}$ frequency subband being noise is smaller. In the solution in this embodiment, by comparing the Pb(m,k) with an energy ratio upper limit Pb_U(k) and an energy ratio lower limit Pb_L(k), the probability of the component of the $k^{th}$ frequency subband being speech is judged. For example, in the solution in this embodiment, Pb_U(k) is set as 4, and Pb_L(k) is set as 2. If Pb(m,k)≥Pb_U(k), the probability of the signal component within the frequency subband being speech is 1, and the noise suppression function $G_d$(m,k)=1; and, if Pb(m,k)≤Pb_L(k), the probability of the signal component within the frequency subband being speech is 0, all is noise, and $G_d$(m,k)=RL. RL<1 determines the largest denoising amount. If Pb_U(Pb(k)>Pb(m,k)>Pb_L(k), there are speech and noise in the signal component within the frequency subband, no operation is performed, and RL<$G_d$(m,k)<1. Finally, by the $G_d$(m,k)*$S_1$(m,k) operation, the noise component within each of the frequency subbands is suppressed to obtain a denoised signal $S_d$(m,k).

Single-Microphone Denoising Module 432:

The single-microphone denoising module 432 is configured to, on each of the frequency subbands, calculate the steady noise energy of the received signal on the frequency subband by a moving average algorithm, and further calculate a value of a speech component proportional function on the frequency subband; and multiply the speech component proportional function by the received signal to obtain a signal with suppressed steady noise and then output the signal with suppressed steady noise to the inverse fast Fourier transform module 44.

In this embodiment, the input of the single-microphone denoising module 432 is set as $S_{si}$(m,k). This input will be different according to a denoising mode. When in a multi-microphone denoising mode, $S_{si}$(m,k) is the output $S_d$(m,k) of the multi-microphone denoising module 431 after denoising; and, when in a single-microphone denoising mode, $S_{si}$(m,k) is the signal $S_1$(m,k) from the main microphone. This module calculates the energy $P_n$(m,k) of steady noise of $S_{si}$(m,k) in each of the frequency bands by a moving average algorithm:

$$P_n(m,k) = \alpha * P_n(m,k) + (1-\alpha) * P_s(m,k),$$

where α is the smoothing parameter. For example, in this embodiment, α=0.98. $P_s$(m,k) is the energy spectrum of an input signal of this module:

$$P_s(m,k) = (abs(S_{si}(m,k)))^2.$$

As the energy of the steady noise will not change too much, the energy of the steady noise may be estimated by slow smooth averaging. Therefore, a ratio of the speech component within each of the frequency subband is:

$$G_s(m,k) = \frac{P_s(m,k) - P_n(m,k)}{P_s(m,k)}.$$

Finally, by $G_s$(m,k)*$S_{si}$(m,k), the speech component within each of the frequency subband is retained to obtain a noise-suppressed frequency domain signal $S_{so}$(m,k).

Inverse fast Fourier transform module 44: the output frequency domain signal $S_{so}$(m,k) of the single-microphone denoising module 432 is converted into a time domain signal by Inverse Fast Fourier Transform (IFFT), so as to obtain a final denoised output signal $s_o$(m,n):

$$S_o(m,n) = \frac{1}{N}\sum_{k=0}^{N-1} S_{so}(m,k)e^{j2\pi nk/N}.$$

In this embodiment, when the near-field speech detection module 421 detects that there is noise only in the current signal, the user is listening instead of talking, so the holding manner of the user cannot be judged, and the denoising mode to be used currently cannot be judged correctly. Therefore, in the present invention, it is supposed that the previously detected holding manner is unchanged up to now, the original denoising mode is remained until the holding manner of the user can be judged correctly when the user talks next time.

In conclusion, by the method and device provided by the present invention, the mobile phone holding state of a user is detected when the user is talking on the phone, so that different denoising solutions will be employed according to the state of the user in holding the mobile phone. When the user holds the mobile phone normally, a solution integrating multi-microphone denoising and single-microphone denoising will be employed to effectively suppress both the steady noise and the non-steady noise; and when the user holds the mobile phone abnormally, a solution of single-microphone denoising only will be employed to suppress the steady noise. The distortion of speech by multi-microphone denoising is avoided, and the speech quality is ensured.

The above description merely illustrates the preferred embodiments of the present invention and is not intended to limit the protection scope of the present invention. Any modification, equivalent replacement and improvement made within the spirit and principle of the present invention shall fall into the protection scope of the present invention.

The invention claimed is:

1. A speech enhancement method for mobile phones, a main microphone being provided on the bottom of a mobile phone, one or more auxiliary microphones being provided in the mobile phone at a position far away from the main microphone, characterized in that the method comprises the following steps of:
   judging whether a user is talking or listening according to signals from both the main microphone and the auxiliary microphones, wherein the judging whether the user is talking or listening according to signals from both the main microphone and the auxiliary microphones includes the additional steps of:
   calculating a correlation value between the signal from the main microphone and the signal from the auxiliary microphones;
   judging that the user is listening if the correlation value is less than or equal to the first threshold;
   further detecting the mobile phone holding state of the user, i.e., whether the user holds the mobile phone normally or abnormally, when judging that the user is talking, and keeping the previous speech enhancement solution unchanged when judging that the user is listening;
   employing a solution integrating multi-microphone denoising and single-microphone denoising to perform speech enhancement, when detecting that the user holds the mobile phone normally; and
   employing a solution of single-microphone denoising only to perform speech enhancement, when detecting that the user holds the mobile phone abnormally.

2. The method according to claim 1,
   wherein the calculating the correlation value between the signal from the main microphone and the signal from the auxiliary microphones is as follows: calculating a correlation value between the signal from the main microphone and the signal from each of the auxiliary microphones and averaging the correlation values to obtain an average correlation value, or, calculating a correlation value between the signal from the main microphone and the signal from one of the auxiliary microphones.

3. The method according to claim 1, characterized in that the detecting the mobile phone holding state of the user, i.e., whether the user holds the mobile phone normally or abnormally, comprises the following steps of:
   detecting the direction of the speech by a plurality of microphones, determining that the user holds the mobile phone normally if the speech comes from the bottom of the mobile phone, and determining that the user holds the mobile phone abnormally if the speech comes from the lateral or top of the mobile phone;
   or, calculating a ratio of the energy of the signal from the main microphone to the energy of the signal from the auxiliary microphones, determining that the user holds the mobile phone normally if the ratio is greater than a second threshold, and determining the user holds the mobile phone abnormally if the ratio is less than or equal to the second threshold.

4. The method according to claim 1, characterized in that prior to the judging whether the user is talking or listening according to signals from both the main microphone and the auxiliary microphones, the method further comprises a step of performing fast Fourier transform to the signals from both the main microphone and the auxiliary microphones; and
   after the speech enhancement, the method further comprises a step of performing inverse fast Fourier transform to the denoised signals.

5. The method according to claim 4, characterized in that the employing a solution integrating multi-microphone denoising and single-microphone denoising to perform speech enhancement comprises the following steps of:
   performing multi-microphone denoising first and then performing single-microphone denoising;
   wherein the performing multi-microphone denoising first is as follows: on each of the frequency subbands, calculating a ratio of the energy of the signal from the main microphone to the energy of the signal from the auxiliary microphones on the frequency subband, and determining a value of a noise suppression function on the frequency subband according to the ratio of the energy; and multiplying the noise suppression function by the signal from the main microphone to obtain a signal with suppressed non-steady noise;
   then, the performing single-microphone denoising is as follows: on each of the frequency subbands, calculating a steady noise energy of the signal with suppressed non-steady noise on the frequency subband by a moving average algorithm, and further calculating a value of a speech component proportional function on the frequency subband; and multiplying the speech component proportional function by the signal with suppressed non-steady noise to obtain a signal with both suppressed non-steady noise and suppressed steady noise; and
   the employing a solution of single-microphone denoising only to perform speech enhancement comprises the following steps of: on each of the frequency subbands, calculating a steady noise energy of the signal from the main microphone on the frequency subband by the moving average algorithm, and further calculating a value of the speech component proportional function on the frequency subband; and multiplying the speech component proportional function by the signal from the main microphone to obtain a signal with suppressed steady noise.

6. A speech enhancement device for mobile phones, a main microphone being provided on the bottom of a mobile phone, one or more auxiliary microphones being provided in the mobile phone at a position far away from the main microphone, characterized in that the device comprises a detection unit and a denoising unit, wherein:
   the detection unit is configured to judge whether a user is talking or listening according to signals from both the main microphone and the auxiliary microphones, wherein the judging whether the user is talking or listening according to signals from both the main microphone and the auxiliary microphones includes the following steps of:
   calculating a correlation value between the signal from the main microphone and the signal from the auxiliary microphones;

judging that the user is talking if the correlation value is greater than a first threshold; and judging that the user is listening if the correlation value is less than or equal to the first threshold;

further detect the mobile phone holding state of the user, i.e., whether the user holds the mobile phone normally or abnormally, and notify the denoising unit with the result of detection, when judging that the user is talking; and, do no further operation, and allow the denoising unit to keep the previous speech enhancement solution unchanged, when judging that the user is listening; and the denoising unit is configured to, when receiving a notification indicating that the user holds the mobile phone normally, employ a solution integrating multi-microphone denoising and single-microphone denoising to perform speech enhancement; and, when receiving a notification indicating that the user holds the mobile phone abnormally, employ a solution of single-microphone denoising only to perform speech enhancement.

7. The device according to claim 6, characterized in that the detection unit comprises a near-field speech detection module and a holding state detection module; and the denoising unit comprises a multi-microphone denoising module and a single-microphone denoising module; wherein:

the near-field speech detection module is configured to receive signals from both the main microphone and the auxiliary microphones, judge whether the user is talking or listening according to signals from both the main microphone and the auxiliary microphones, send a notification to the holding state detection module when judging that the user is talking, and not to send a notification to the holding state detection module when judging that the user is listening;

the holding state detection module is configured to receive signals from both the main microphone and the auxiliary microphones, detect the mobile phone holding state of the user, i.e., whether the user holds the mobile phone normally or abnormally, when receiving a notification from the near-field speech detection module, send the signals from both the main microphone and the auxiliary microphones to the multi-microphone denoising module when detecting that the user holds the mobile phone normally, and send the signal from the main microphone to the single-microphone denoising module when detecting that the user holds the mobile phone abnormally;

the multi-microphone denoising module is configured to perform multi-microphone denoising to the received signal and then send the denoised signal to the single-microphone denoising module; and the single-microphone denoising module is configured to perform single-microphone denoising to the received signal and the output the denoised signal.

8. The device according to claim 7, wherein the calculating the correlation value between the signal from the main microphone and the signal from the auxiliary microphones is as follows: calculating a correlation value between the signal from the main microphone and the signal from each of the auxiliary microphones and averaging the correlation values to obtain an average correlation value, or, calculating a correlation value between the signal from the main microphone and the signal from one of the auxiliary microphones.

9. The device according to claim 7, characterized in that the holding state detection module is configured to detect the direction of the speech by a plurality of microphones, determine that the user holds the mobile phone normally if the speech comes from the bottom of the mobile phone, and determine that the user holds the mobile phone abnormally if the speech comes from the lateral or top of the mobile phone;

or, the holding state detection module is configured to calculate a ratio of the energy of the signal from the main microphone to the energy of the signal from the auxiliary microphones, determine that the user holds the mobile phone normally if the ratio is greater than a second threshold, and determine the user holds the mobile phone abnormally if the ratio is less than or equal to the second threshold.

10. The device according to claim 7, characterized in that the device further comprises a fast Fourier transform module and an inverse fast Fourier transform module, wherein:

the fast Fourier transform module, the input of which is connected to the main microphone and the auxiliary microphones and the output of which is connected to the detection unit, is configured to perform fast Fourier transform to the signals from both the main microphone and the auxiliary microphones, respectively, and then send the transformed signals to the near-field speech detection module and the holding state detection module;

the multi-microphone denoising module is configured to, on each of the frequency subbands, calculate a ratio of the energy of the signal from the main microphone to the energy of the signal from the auxiliary microphones on the frequency subband, and determine a value of a noise suppression function on the frequency subband according to the ratio of energy; and multiply the noise suppression function by the signal from the main microphone to obtain a signal with suppressed non-steady noise and outputs the signal with suppressed non-steady noise to the single-microphone denoising module;

the single-microphone denoising module is configured to, on each of the frequency subbands, calculate a steady noise energy of the received signal on the frequency subband by a moving average algorithm, and further calculate a value of a speech component proportional function on the frequency subband; and multiply the speech component proportional function by the received signal to obtain a signal with suppressed steady noise and then output the signal with suppressed steady noise to the inverse fast Fourier transform module; and the inverse fast Fourier transform module, the input of which is connected to the denoising unit, is configured to perform inverse fast Fourier transform to the denoised signal and then output the transformed signal.

* * * * *